United States Patent
Goldberg et al.

(10) Patent No.: US 10,514,054 B2
(45) Date of Patent: Dec. 24, 2019

(54) HYBRID METAL PLASTIC SHEAR FASTENER

(71) Applicant: Ford Motor Company, Dearborn, MI (US)

(72) Inventors: Ira Jason Goldberg, Ann Arbor, MI (US); David Alexander Goff, Detroit, MI (US)

(73) Assignee: Ford Motor Company, Dearborn, MI (US)

( * ) Notice: Subject to any disclaimer, the term of this patent is extended or adjusted under 35 U.S.C. 154(b) by 307 days.

(21) Appl. No.: 15/420,214

(22) Filed: Jan. 31, 2017

(65) Prior Publication Data
US 2018/0216651 A1    Aug. 2, 2018

(51) Int. Cl.
*F16B 31/02* (2006.01)
*F16B 35/04* (2006.01)

(52) U.S. Cl.
CPC .......... *F16B 31/021* (2013.01); *F16B 35/045* (2013.01)

(58) Field of Classification Search
CPC ................................... F16B 31/021
USPC ............................ 411/1–3, 5, 395
See application file for complete search history.

(56) References Cited

U.S. PATENT DOCUMENTS

| | | | | |
|---|---|---|---|---|
| 2,663,344 A * | 12/1953 | Burdick | .................. | F16B 39/34 16/381 |
| 2,766,080 A * | 10/1956 | Fineran | .................... | F16B 39/34 16/380 |
| 4,068,555 A * | 1/1978 | Volkman | ............... | F16B 31/021 411/2 |
| 4,137,816 A * | 2/1979 | Gartner | ................... | F16B 31/02 411/2 |
| 4,149,434 A * | 4/1979 | Wilson | .................. | B25B 15/004 411/2 |
| 4,836,727 A * | 6/1989 | Volkmann | ............. | F16B 31/021 411/4 |
| 5,176,050 A * | 1/1993 | Sauer | .................. | B25B 23/1415 81/180.1 |
| 5,256,015 A | 10/1993 | St. Clair | | |
| 5,713,705 A | 2/1998 | Grünbichler | | |
| 6,802,680 B1 * | 10/2004 | Rubenstein | ........... | F16B 31/021 411/383 |
| 7,066,062 B2 * | 6/2006 | Flesher | ................. | B25B 13/485 411/403 |
| 2008/0166203 A1 | 7/2008 | Reynolds et al. | | |

* cited by examiner

*Primary Examiner* — Flemming Saether
(74) *Attorney, Agent, or Firm* — Vincent Mastrogiacomo; Brooks Kushman P.C.

(57) ABSTRACT

A hybrid metal plastic shear fastener bolt. The bolt includes a metal body having a first end and an opposing second end including a head and including a threaded shaft extending from the first end towards the second end along a longitudinal bolt axis. The bolt also includes a plastic torque head formed on the metal body configured to shear away from the metal body at a predetermined torque.

20 Claims, 4 Drawing Sheets

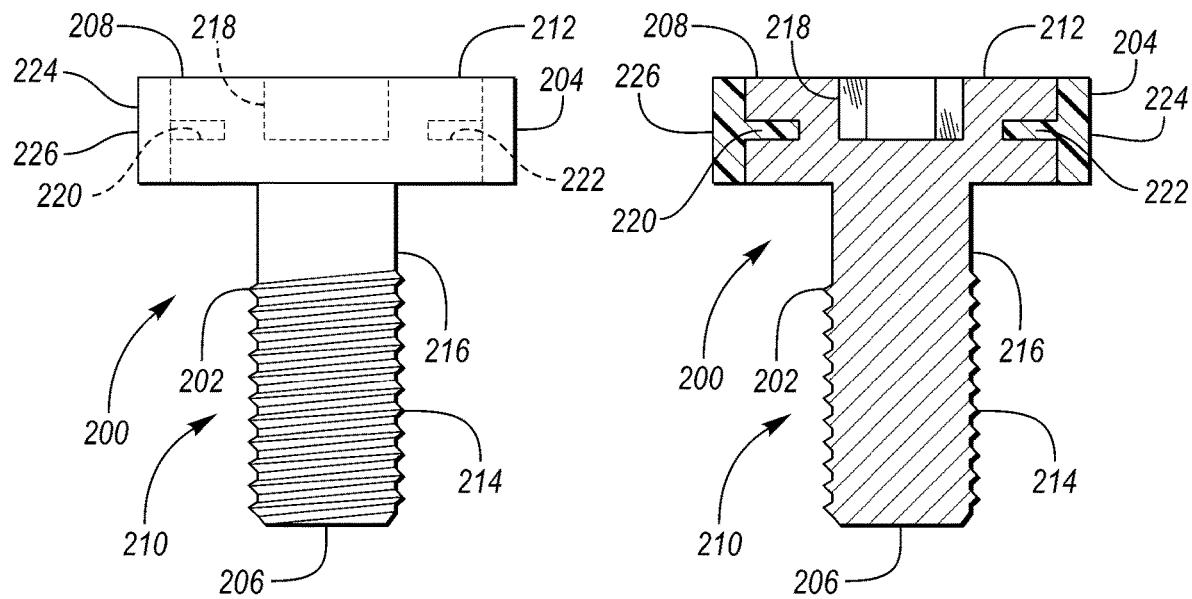
FIG. 9　　　　　FIG. 10
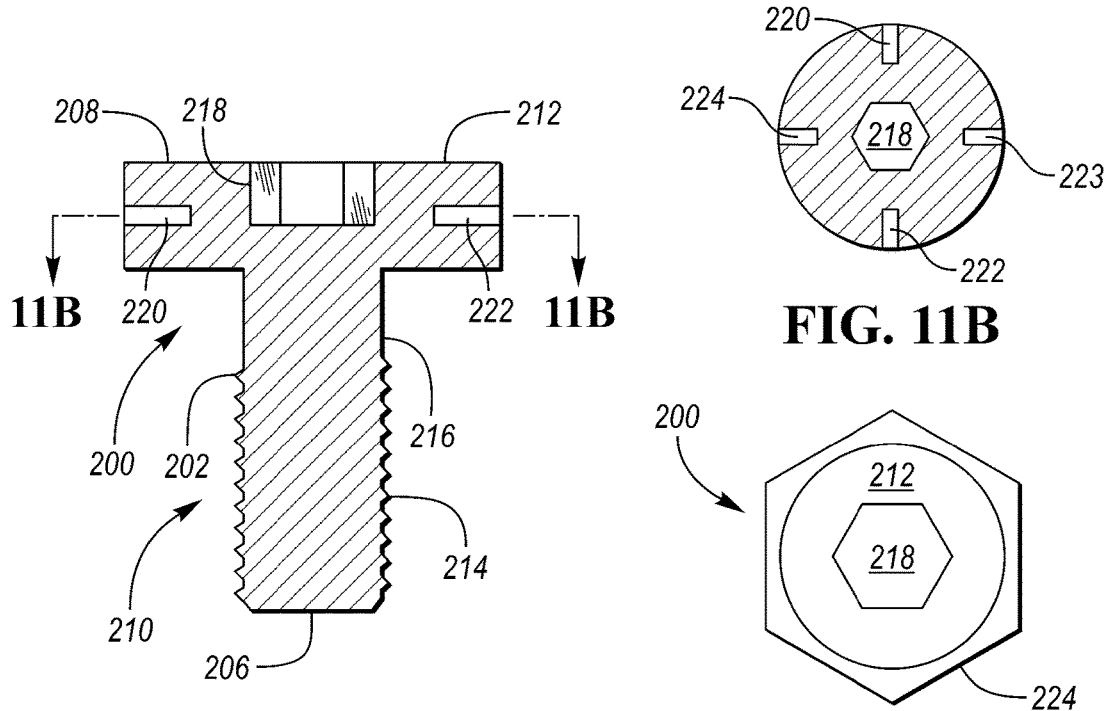
FIG. 11A　　FIG. 11B
FIG. 12

HYBRID METAL PLASTIC SHEAR FASTENER

TECHNICAL FIELD

The present disclosure relates to a hybrid metal plastic shear fastener, for instance, a bolt including a metal main body and a plastic torque head.

BACKGROUND

In many manufacturing applications, such as automotive manufacturing operations, fasteners are utilized to join two or more parts to form a joint between the fastener and the two or more parts. A specific torque is applied to the fastener during the joining step. In certain applications, it may be difficult to apply the specific torque to the fastener. Quality torque control drivers and recorders have been proposed to alleviate the difficulty of applying the proper amount of torque to the fastener. However, these devices require extensive investment and maintenance. If the applied torque exceeds the specified torque, it may cause damage to the fastener, joint and/or parts.

SUMMARY

In a first embodiment, a hybrid metal plastic shear fastener bolt is disclosed. The bolt includes a metal body having a first end and an opposing second end including a head and including a threaded shaft extending from the first end towards the second end along a longitudinal bolt axis. The bolt also includes a plastic torque head formed on the metal body configured to shear away from the metal body at a predetermined torque.

In a second embodiment, a hybrid metal plastic shear fastener bolt is disclosed. The bolt includes a metal body having a first end and an opposing second end including a head having an outer periphery and including a threaded shaft extending from the first end towards the second end along a longitudinal bolt axis. The bolt further includes a plastic torque head formed on the outer periphery of the head and configured to shear away from the metal body at a predetermined torque.

In a third embodiment, a hybrid metal plastic shear fastener bolt is disclosed. The bolt includes a metal body having a first end and an opposing second end including a head having an aperture extending along a longitudinal bolt axis. The bolt further includes a plastic torque head formed at least partially within the metal body head aperture and configured to shear away from the metal body at a predetermined torque.

BRIEF DESCRIPTION OF THE DRAWINGS

FIG. 9 is a side elevation view of a bolt according to a third embodiment;

FIG. 10 is a cross-section view of the bolt according to the third embodiment;

FIG. 11A is a sectional view of the bolt according to the third embodiment;

FIG. 11B is a cross-section view of the bolt shown in FIG. 11A taken about line 11B-11B;

FIG. 12 is a top view of the bolt according to the third embodiment;

DETAILED DESCRIPTION

Figure 1:
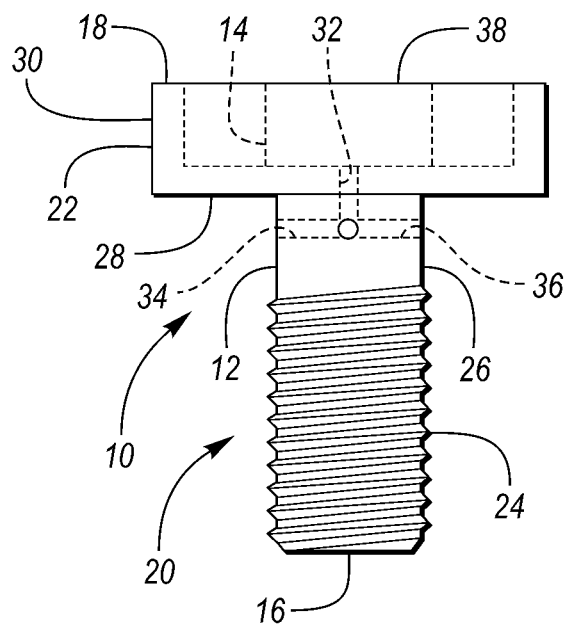
FIG. 1 is a side elevation view of a bolt according to a first embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In many manufacturing applications, such as automotive manufacturing operations, fasteners are utilized to join two or more parts to form a joint between the fastener and the two or more parts. A specific torque is applied to the fastener during the joining step. In certain applications, it may be difficult to apply the specific torque to the fastener. Quality torque control drivers and recorders have been proposed to alleviate the difficulty of applying the proper amount of torque to the fastener. However, these devices require extensive investment and maintenance. If the applied torque exceeds the specified torque, it may cause damage to the fastener, joint and/or parts.

As an alternative proposal, shear bolts formed completely of metal have been used in many industries. In one example, a metal shear bolt includes a permanent clamping head and a torque head with a bridge extending therebetween. When the upper limit torque of the bridge is met, the torque head is sheared off from the permanent head at the weakest portion of the bridge. One downside to metal shear bolts is that they commonly produce undesired metal scrap, uneven and unfinished shear points on the head of the bolt, and are generally unserviceable.

Yet another proposal is directed to a metal torque limiting bolt having metal shear pins that are retained within the metal bolt head. This proposal is difficult to fabricate, thereby making the design more expensive than other shear bolts. Due to the expense and complication of this proposed metal torque limiting bolt, it is not a practical solution in many applications.

In one or more embodiments of the present invention, a plastic and metal hybrid bolt is disclosed. The plastic and metal hybrid bolt, in one or more embodiments, may overcome one or more drawbacks of conventional metal shear bolt design, including, without limitation, undesired scrap, uneven, unfinished, and exposed metal shear surfaces, and serviceability, while providing an adequate joint between the bolt and joined parts.

In one or more embodiments, a plastic and metal hybrid bolt is disclosed. The bolt includes a metal body having a first end including a threaded shaft having a longitudinal bolt axis and an opposing second end including a head. The metal body can be formed of steel or aluminum. The bolt also includes a plastic torque head formed on the metal body. The plastic torque head can be formed of polyamide, polybutylene terephthalate, polypropylene and mixtures thereof. In one embodiment, the metal body is formed of steel and the plastic torque head is formed of polyamide. The plastic may be overmolded on the metal body using suitable forming techniques, such as injection molding. The plastic torque head may be adhered directly to the metal body. The metal body may include geometric retention features to enhance the retention of the plastic torque head on the metal body.

When the plastic and metal hybrid bolt is being installed to join two or more parts, the plastic torque head is engaged by a torque tool, such as a wrench, ratchet nut, drive head or spanner wrench. As described in the embodiments herein, the plastic torque head includes an internal and/or external profile configured to engage the torque tool. The plastic torque head is designed to fail at a specified, predetermined torque. The range for the specified, predetermined torque may be any of the following values or in the range of any two of the following values: 1.0 N*m, 1.5 N*m, 2 N*m, 2.5 N*m, 3.0 N*m, 3.5 N*m, 4.0 N*m, 4.5 N*m and 5.0 N*m. The plastic torque head no longer imparts torque to the metal body once failure has occurred. Once this condition has been met, the metal body is situated in a position to achieve the requisite strength of the joint between the metal body and the two or more parts, while not damaging these components.

The plastic and metal hybrid bolt can be used in many automotive industry applications. Non-limiting examples of such automotive industry applications include any application where a bolted joint is used, such as, lower torque operation, including installation of trim panels.

As described in the embodiments herein, the metal body head includes an internal and/or external profile configured to engage a torque tool. This engagement profile is utilized when the bolt is serviced, e.g., removed to replace it with a replacement bolt.

Figure 2:
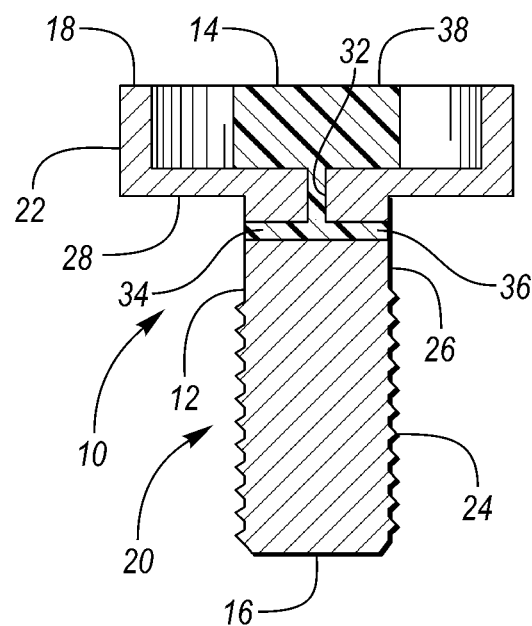
FIG. 2 is a cross-section view of the bolt according to the first embodiment.
Figure 3:
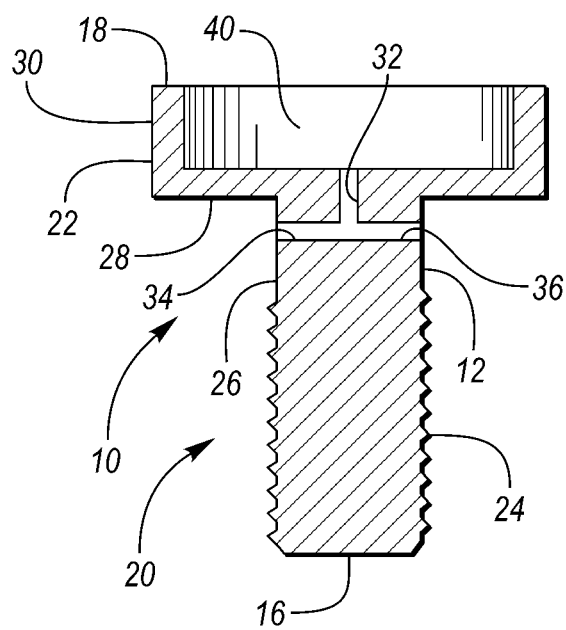
FIG. 3 is a sectional view of the bolt according to the first embodiment.
Figure 4:
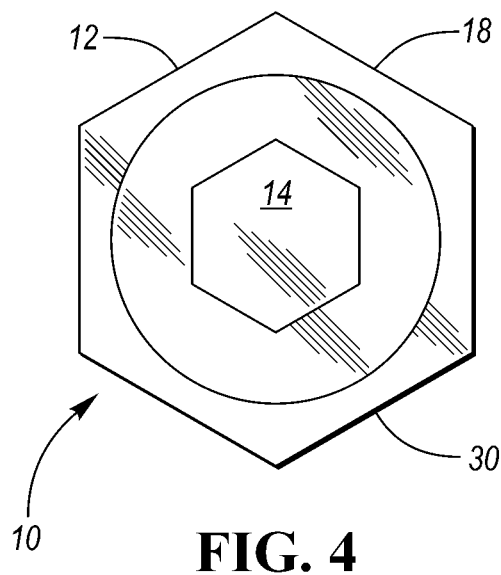
FIG. 4 is a top view of the bolt according to the first embodiment.

FIGS. 1-4 depict a bolt 10 including a metal body 12 and a plastic torque head 14 according to a first embodiment. FIG. 1 depicts an elevation view of bolt 10. FIG. 2 depicts a cross-section view of bolt 10. FIG. 3 depicts a sectional view of metal body 12 without plastic torque head 14. FIG. 4 depicts a top view of bolt 10.

Metal body 12 includes a first end 16 and an opposing second end 18. A shaft 20 extends along a longitudinal bolt axis from first end 16 to a metal head 22, which is proximate second end 18. Shaft 20 and metal head 22 are integrally formed to provide a serviceable bolt 10, e.g., a bolt that can be removed and replaced.

As shown in FIGS. 1-3, shaft 20 includes a threaded portion 24 and a non-threaded portion 26. Shaft 20 can be fabricated with different diameters and lengths depending on the application. Threaded portion 24 can be a left-handed thread or a right-handed thread depending on the application. Threaded portion 24 is configured to be driven through an aperture on each of two or more parts joined by bolt 10. As shown in FIGS. 1-3, about 75% of the length of shaft 20 includes threaded portion 24, while other percentages, such as 100%, 50% and 25%, are also contemplated.

Metal head 22 includes a base portion 28 and an extending portion 30 extending away from base portion 28. Base portion 28 includes a longitudinal conduit 32 extending along the longitudinal bolt axis. Conduit 32 is configured to receive molten plastic when the torque head 14 is being molded onto head 22, as shown in FIGS. 1 and 2. In the embodiment shown, longitudinal conduit 32 extends partially within non-threaded shaft portion 26. Non-threaded shaft portion 26 also includes a number of radial conduits formed therein and extending radially from the longitudinal bolt axis. As shown, first and second radial conduits 34 and 36 are connected to longitudinal conduit 32. In other embodiments, bolt 10 may include 3, 4, 5, 6, 7 or 8 radial conduits. In certain embodiments, the radial conduits are equally spaced from each other. First and second radial conduits 34 and 36 are configured to receive molten plastic when the torque head 14 is being molded onto head 22, as shown in FIGS. 1 and 2. Upon the plastic curing and/or hardening, the plastic occupying conduits 32, 34 and 36 reinforce and strengthen plastic torque head 14 and the strength of the connection between metal body 12 and plastic torque head 14.

As shown in FIG. 4, the outer profile of head 22 is generally hexagonal and the inner profile of head 22 is generally circular. In other embodiments, the outer profile of head 22 may be non-hexagonal. The outer hexagonal profile of head 22 is configured so that it can be engaged by torque tool to drive bolt 10, for example, removing bolt 10 from a joint for servicing. The inner circular profile of head 22 is configured to provide clearance for a torque tool to engage the outer profile of plastic torque head 14, which has a generally hexagonal outer surface. For example, the outer hexagonal surface of torque head 14 is configured to be engaged to drive bolt 10 into parts to form a joint. Upon applying the specified torque, the torque head 14 shears off without damaging bolt 10 or the parts being joined.

As shown in FIG. 3, metal body 12 is shown without plastic torque head 14. For example, metal body 12 is shown prior to the plastic torque head 14 being molded onto metal body 12. As another example, metal body 12 is shown after plastic torque head 14 has been sheared off. However, only a head portion 38 of plastic torque head 14 may be sheared off during the driving step. The molded plastic situated in the conduits 32, 24 and 36 may remain. As further shown, extending portion 30 includes a generally circular inner surface 40. The circular inner surface 40 has a diameter that is at least 40%, 50% or 60% greater than the diameter of plastic torque head to provide clearance for a torque tool to engage the outer surface of torque head 14.

Figure 5:
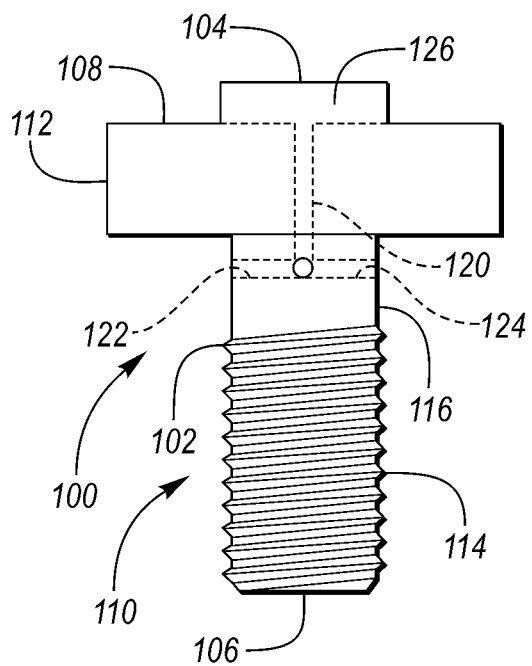
FIG. 5 is a side elevation view of a bolt according to a second embodiment.
Figure 6:
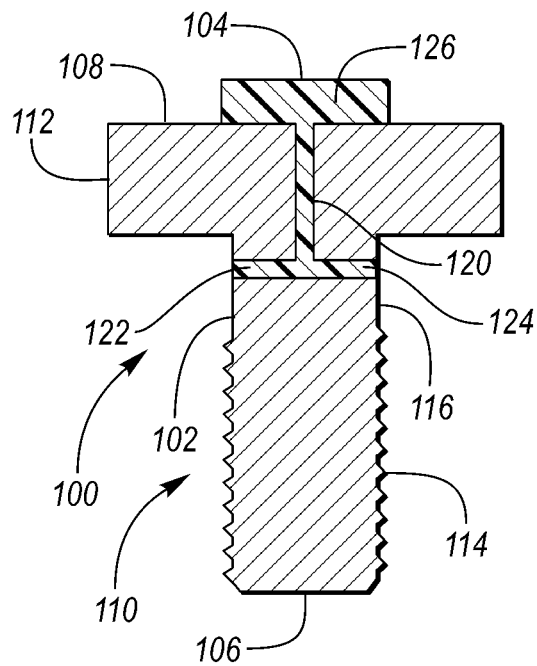
FIG. 6 is a cross-section view of the bolt according to the second embodiment.
Figure 7:
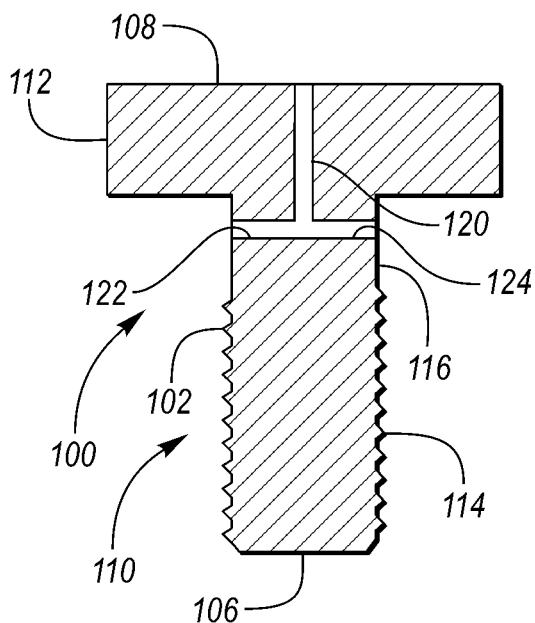
FIG. 7 is a sectional view of the bolt according to the second embodiment.
Figure 8:
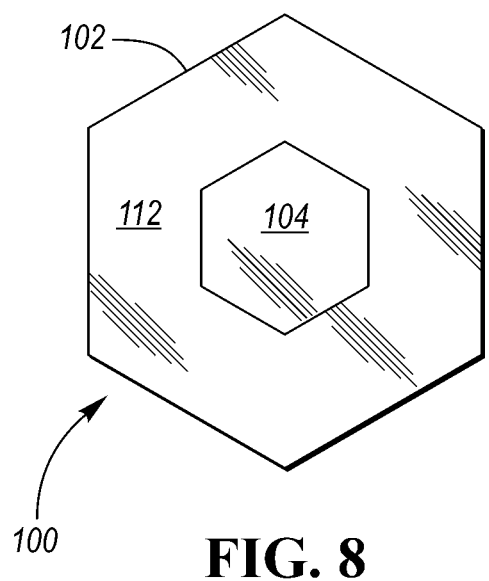
FIG. 8 is a top view of the bolt according to the second embodiment.
Figure 13A:
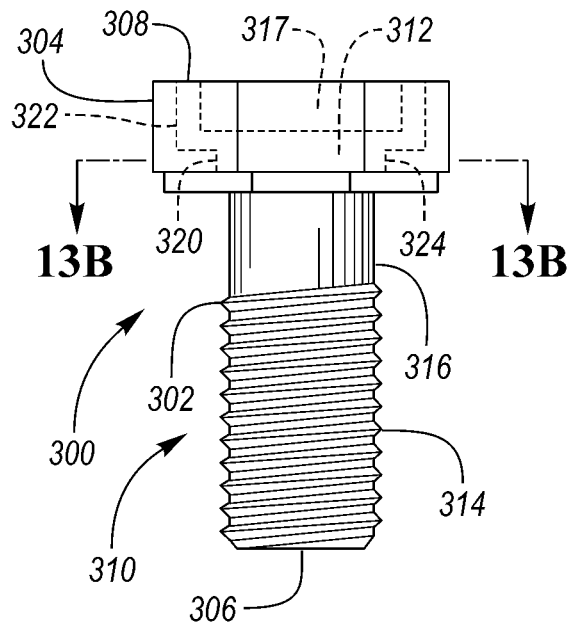
FIG. 13A is side elevation view of a bolt according to a fourth embodiment.
Figure 13B:
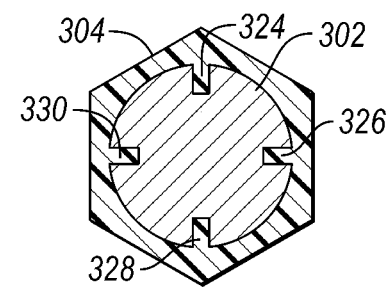
FIG. 13B is a cross-section view of the bolt shown in FIG. 13A taken about line 13B-13B.

FIGS. 5-8 depict a bolt 100 including a metal body 102 and a plastic torque head 104 according to a second embodiment. FIG. 5 depicts an elevation view of bolt 100. FIG. 6 depicts a cross-section view of bolt 100. FIG. 7 depicts a sectional view of metal body 102 without plastic torque head 104. FIG. 8 depicts a top view of bolt 100.

Metal body 102 includes a first end 106 and an opposing second end 108. A shaft 110 extends along a longitudinal bolt axis from first end 106 to a metal head 112, which is proximate second end 108. Shaft 110 and metal head 112 are integrally formed to provide a serviceable bolt, e.g., a bolt that can be removed and replaced.

As shown in FIGS. 5-7, shaft 110 includes a threaded portion 114 and a non-threaded portion 116. Shaft 110 can be fabricated with different diameters and lengths depending on the application. Threaded portion 114 can be a left-handed thread or a right-handed thread depending on the application. Threaded portion 114 is configured to be driven through an aperture on each of two or more parts joined by bolt 100. As shown in FIGS. 5-7, about 75% of the length of shaft 110 includes threaded portion 114, while other percentages, such as 100%, 50% and 25%, are also contemplated.

Metal head 112 also includes a longitudinal conduit 120 extending along the longitudinal bolt axis within metal head 112 and a portion of non-threaded portion 116 of shaft 110. Longitudinal conduit 120 is connected to the surface of metal head 112. Conduit 120 is configured to receive molten plastic when the torque head 104 is being molded onto head 112, as shown in FIGS. 5 and 6. Non-threaded shaft portion 116 also includes a number of radial conduits formed therein and extending radially from the longitudinal bolt axis. As shown, first and second radial conduits 122 and 124 are connected to longitudinal conduit 120. In other embodiments, bolt 100 may include 3, 4, 5, 6, 7 or 8 radial conduits. In certain embodiments, the radial conduits are equally spaced from each other. First and second radial conduits 122 and 124 are configured to receive molten plastic when the torque head 104 is being molded onto metal head 112, as shown in FIGS. 5 and 6. Upon the molten plastic curing and/or hardening, the plastic occupying conduits 120, 122 and 124 reinforce and strengthen plastic torque head 104 and the strength of the connection between metal body 102 and plastic torque head 104.

As shown in FIG. 8, the outer profile of head 112 is generally hexagonal. As shown in FIG. 7, the inner profile of head 112 is generally hexagonal. In other embodiments, the outer and/or inner profiles of head 112 may be non-hexagonal. The outer and inner hexagonal profiles of head 112 are configured so that they can be engaged by a torque tool to drive bolt 100, for example, removing bolt 100 from a joint for servicing and/or replacement. In other embodiments, only one of the inner and outer profiles of head 112 is hexagonal. The outer profile of plastic torque head 104 has a generally hexagonal outer surface configured to be engaged to drive bolt 100 into parts to form a joint. In other embodiments, the outer profile of head 104 may be non-hexagonal. Upon applying the specified torque, the torque head 104 shears off without damaging bolt 100 or the parts being joined.

As shown in FIG. 7, metal body 102 is shown without plastic torque head 104. For example, metal body 102 is shown prior to the plastic torque head 104 being molded onto metal body 102. As another example, metal body 102 is shown after plastic torque head 104 has been sheared off. However, only a head portion 126 may be sheared off during the driving step. The molded plastic situated in the conduits 120, 122 and 124 may remain.

FIGS. 9-12 depict a bolt 200 including a metal body 202 and a plastic torque head 204 according to a third embodiment. FIG. 9 depicts an elevation view of bolt 200. FIG. 10 depicts a cross-section view of bolt 200. FIG. 11A depicts a sectional view of metal body 202 without plastic torque head 204. FIG. 11B depicts a cross-section view of metal body 202 taken about line 11B-11B of FIG. 11A. FIG. 12 depicts a top view of bolt 200.

Metal body 202 includes first end 206 and an opposing second end 208. A shaft 210 extends along a longitudinal bolt axis from first end 206 to a metal head 212, which is proximate second end 208. Shaft 210 and metal head 212 are integrally formed to provide a serviceable bolt, e.g., a bolt that can be removed or replaced.

As shown in FIGS. 9-11, shaft 210 includes a threaded portion 214 and a non-threaded portion 216. Shaft 210 can be fabricated with different diameters and lengths depending on the application. Threaded portion 214 can be a left-handed thread or a right-handed thread depending on the application. Threaded portion 214 is configured to be driven through an aperture on each of two or more parts joined by bolt 200. As shown in FIGS. 9-11, about 75% of the length of shaft 210 includes threaded portion 214, while other percentages, such as 100%, 50% and 25%, are also contemplated.

Metal head 212 includes an inner cavity 218. Metal head 212 also includes a number of radial conduits formed therein and extending radially from the longitudinal bolt axis. As shown, first and second radial conduits 220 and 222 are connected to inner cavity 218. In other embodiments, bolt 200 may include 3, 4, 5, 6, 7 or 8 radial conduits. In certain embodiments, the radial conduits are equally spaced from each other. First and second radial conduits 220 and 222 are configured to receive molten plastic when the torque head 204 is being molded onto metal head 212, as shown in FIGS. 9 and 10. Upon the molten plastic curing and/or hardening, the plastic occupying 220 and 222 reinforce and strengthen plastic torque head 204 and the strength of the connection between metal body 202 and plastic torque head 204.

As shown in FIG. 12, the outer profile of head 212 is generally circular. As shown in FIGS. 11A and 11B, the inner profile of head 212 is generally hexagonal. In other embodiments, the outer and/or inner profiles of head 112 may be varied. The inner hexagonal profile of head 212 is configured so that it can be engaged by a torque tool to drive bolt 200, for example, removing bolt 200 from a joint for servicing and/or replacement. In other embodiments, the inner profile of head 212 is not hexagonal so that the bolt 200 is a non-serviceable bolt. The outer profile 224 of plastic torque head 204 has a generally hexagonal outer surface configured to be engaged to drive bolt 200 into parts to form a joint. In other embodiments, the outer profile of head 204 may be non-hexagonal. Upon applying the specified torque, the torque head 204 shears off without damaging bolt 200 or the parts being joined.

As shown in FIGS. 11A and 11B, metal body 202 is shown without plastic torque head 204. For example, metal body 202 is shown prior to plastic torque head 204 being molded onto metal body 202. As another example, metal body 202 is shown after plastic torque head 204 has been sheared off. However, only an outer peripheral portion 226 may be sheared off during the driving step. The molded plastic situated in conduits 220, 221, 222 and 223 may remain.

Figure 14:
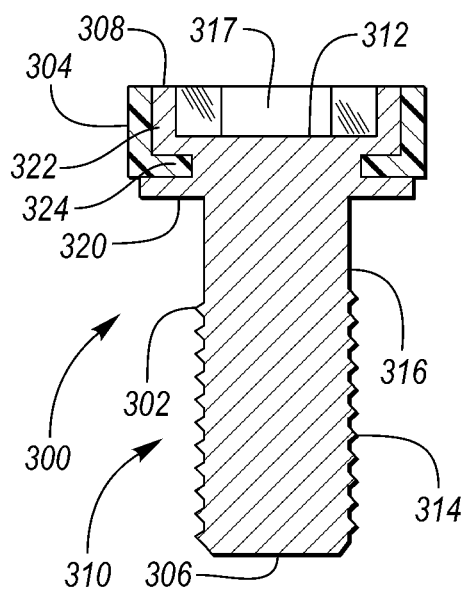
FIG. 14 is a cross-section view of the bolt according to the fourth embodiment.
Figure 15A:
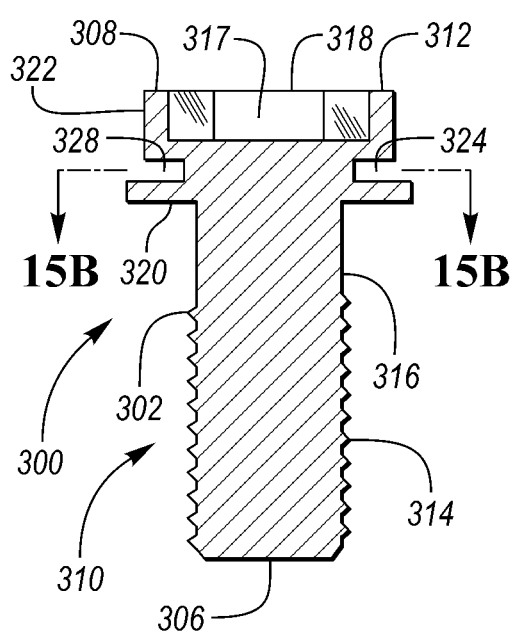
FIG. 15A is a sectional view of the bolt according to the fourth embodiment.
Figure 15B:
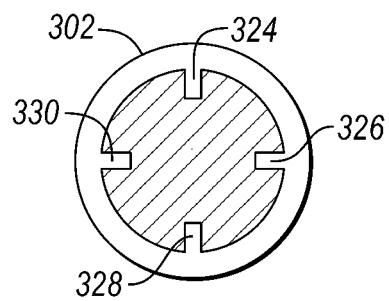
FIG. 15B is a cross-section view of the bolt shown in FIG. 15A taken about line 15B-15B.
Figure 16:
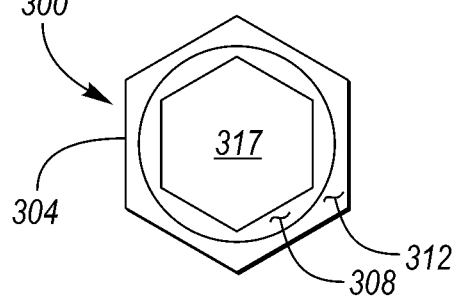
FIG. 16 is a top view of the bolt according to the fourth embodiment.

FIGS. 13-16 depict a bolt 300 including a metal body 302 and a plastic torque head 304 according to a fourth embodiment. FIG. 13A depicts an elevation view of bolt 300. FIG. 13B depicts a cross-section view of bolt 300 taken about line 13B-13B. FIG. 14 depicts a cross-section view of bolt 300. FIG. 15A depicts a sectional view of metal body 302 without plastic torque head 304. FIG. 15B depicts a cross-section view of bolt 300 taken about line 15B-15B. FIG. 16 depicts a top view of bolt 300.

Metal body 302 includes first end 306 and an opposing second end 308. A shaft 310 extends along a longitudinal bolt axis from first end 306 to a metal head 312, which is proximate second end 308. Shaft 310 and metal head 312 are integrally formed to provide a serviceable bolt, e.g., a bolt that can be removed or replaced.

As shown in FIGS. 13-15, shaft 310 includes a threaded portion 314 and a non-threaded portion 316. Shaft 310 can be fabricated with different diameters and lengths depending on the application. Threaded portion 314 can be a left-handed thread or a right-handed thread depending on the application. Threaded portion 314 is configured to be driven through an aperture on each of two or more parts joined by bolt 300. As shown in FIGS. 13-15, about 75% of the length of shaft 310 includes threaded portion 314, while other percentages, such as 100%, 50% and 25%, are also contemplated.

Metal head 312 includes an inner cavity 317, which includes a substantially hexagonal inner profile 318. The inner profile 318 is configured so that it can be engaged by a torque tool to drive bolt 300, for example, removing bolt 300 from a joint for servicing and/or replacement. As shown in FIG. 16, the outer profile of plastic torque head 304 has a generally hexagonal outer surface configured to be engaged to drive bolt 300 into parts to form a joint. Upon applying the specified torque, the torque head 304 shears off without damaging bolt 300 or the part being joined.

As shown in FIGS. 15A and 15B, metal body 302 is shown without plastic torque head 304. For example, metal body 302 is shown prior to plastic torque head 304 being molded onto metal body 302. As another example, metal body 302 is shown after plastic torque head 304 has been sheared off.

Metal head 312 includes peripheral retaining lip 320 and peripheral projection 322 partially forming channel recesses 324, 326, 328 and 330 therebetween. The channel recesses 324, 326, 328 and 330 are configured to receive a portion of plastic torque head 304, which is situated external to metal body 312. Retaining lip 320 is configured to help retain plastic torque head 304 in its location external to metal body 312.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bolt comprising:
a metal body having a first end and an opposing second end including a head and including a threaded shaft extending from the first end towards the second end along a longitudinal bolt axis, the metal body including one or more radial conduits extending radially from the longitudinal bolt axis, the metal body including a longitudinal conduit extending along the longitudinal bolt axis, and the longitudinal conduit connected to the one or more radial conduits; and
a plastic torque head formed (a) on the metal body and (b) within the one or more radial conduits and the longitudinal conduit, the plastic torque head configured to shear away from the metal body at a predetermined torque.

2. The bolt of claim 1, wherein the plastic torque head is disposed at least partially within the metal body head.

3. The bolt of claim 1, wherein the one or more radial conduits includes three radial conduits.

4. The bolt of claim 1, wherein the longitudinal conduit has first and second ends, the first end terminating at the metal body head aperture, and the second end terminating at the one or more radial conduits.

5. A bolt comprising:
a metal body having a first end and an opposing second end including a head defines an aperture extending along a longitudinal bolt axis, the metal body including one or more radial conduits extending radially from the longitudinal bolt axis, the metal body including a longitudinal conduit extending along the longitudinal bolt axis, and the longitudinal conduit connected to the one or more radial conduits; and
a plastic torque head formed (a) at least partially within the metal body head aperture to form an exposed portion and (b) within the one or more radial conduits and the longitudinal conduit to form an embedded portion.

6. The bolt of claim 5, wherein the plastic torque head is at least partially disposed within the head aperture.

7. The bolt of claim 5, wherein the plastic torque head is completely disposed within the head aperture.

8. The bolt of claim 5, wherein the head aperture includes a head aperture profile configured for engagement by a torque tool.

9. The bolt of claim 5, wherein the head includes an outer profile configured for engagement by a torque tool.

10. The bolt of claim 5, wherein the plastic torque head includes an outer profile for engagement by a torque tool.

11. The bolt of claim 5, wherein the exposed portion of the plastic torque head is configured to shear away from the metal body at a predetermined torque and the embedded portion of the plastic torque head is configured to remain within the one or more radial conduits and the longitudinal conduit at the predetermined torque.

12. The bolt of claim 5, wherein the exposed portion of the plastic torque head is connected to the embedded portion of the plastic torque head.

13. The bolt of claim 5, wherein the one or more radial conduits and the longitudinal conduit are configured to receive molten plastic configured to form at least a portion of the plastic torque head.

14. The bolt of claim 5, wherein the longitudinal conduit has first and second ends, the first end terminating at the metal body head aperture, and the second end terminating at the one or more radial conduits.

15. A bolt comprising:
a metal body having a first end and an opposing second end, the metal body including a head and including a threaded shaft portion extending from the first end towards the second end along a longitudinal bolt axis, the metal body including a non-threaded shaft portion extending along the longitudinal bolt axis between the head and the threaded shaft portion, the metal body including one or more radial conduits extending radially from the longitudinal bolt axis within the non-threaded shaft portion, the metal body including a longitudinal conduit extending along the longitudinal bolt axis, and the longitudinal conduit connected to the one or more conduits; and
a plastic torque head formed (a) on the metal body and (b) within the one or more radial conduits and the longitudinal conduit, the plastic torque head configured to shear away from the metal body at a predetermined torque.

16. The bolt of claim 15, wherein the non-threaded shaft portion has a surface, and the one or more radial conduits terminating at the surface of the non-threaded shaft portion.

17. The bolt of claim 15, wherein the longitudinal conduit extends within the non-threaded shaft portion.

18. The bolt of claim 15, wherein the one or more radial conduits includes four radial conduits.

19. The bolt of claim 15, wherein the one or more radial conduits extend radially from the longitudinal bolt axis entirely within the non-threaded shaft portion.

20. The bolt of claim 15, wherein the longitudinal conduit extends partially within the non-threaded shaft portion.

* * * * *